W. H. RODGERS.
Electric Letter-Boxes.
No. 8,839. Reissued Aug. 5, 1879.
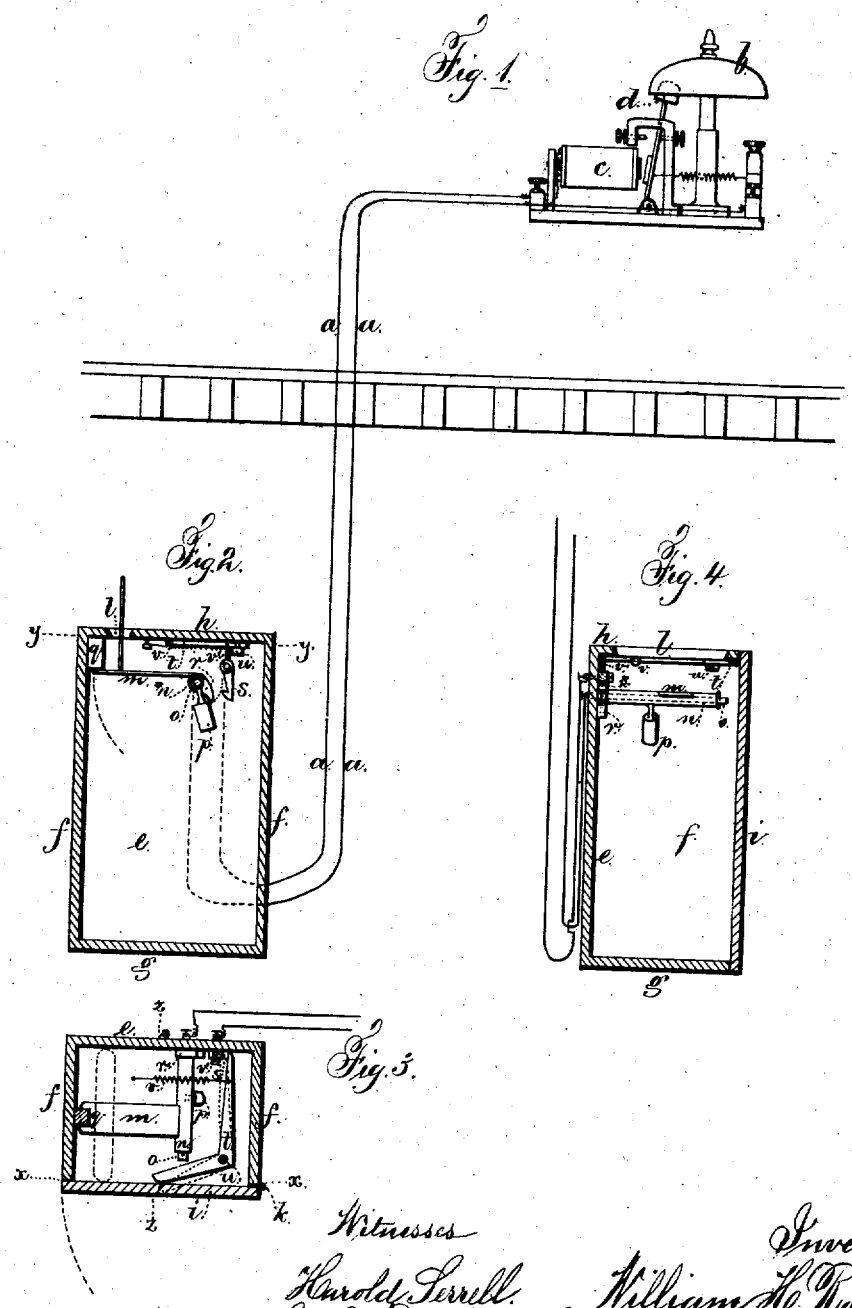
Witnesses
Harold Serrell
Geo. T. Pinckney
Inventor
William H. Rodgers
per Samuel W. Serrell
Atty.
THE NORRIS PETERS CO., WASHINGTON, D. C.

UNITED STATES PATENT OFFICE.

WILLIAM H. RODGERS, OF BROOKLYN, N. Y., ASSIGNOR TO McLAUGHLIN BROTHERS.

IMPROVEMENT IN ELECTRIC LETTER-BOXES.

Specification forming part of Letters Patent No. 214,007, dated April 8, 1879; Reissue No. 8,839, dated August 5, 1879; application filed June 30, 1879.

*To all whom it may concern:*

Be it known that I, WILLIAM H. RODGERS, of Brooklyn, in the county of Kings and State of New York, have invented an Improvement in Electric Letter-Boxes, of which the following is a specification.

Letter-boxes have been connected to an alarm by wires and a circuit-closing device, so that the letter-box may be placed near the entrance-door, and the alarm be given in a distant or upstairs office or room whenever a letter is placed in the box. In this case the weight of the letter as it fell into the box caused a movement of a balanced platform that closed the circuit to the distant instrument.

My present invention is made for rendering the operation of the alarm more certain, and causing the alarm or bell to be sounded until the letter-box receives attention.

My invention relates to the combination, with the letter-box and an alarm operated by electricity, of a flap within the box beneath or behind the slit through which the letter is pressed, said flap swinging so as to allow the letter or card to pass by it.

By this device the electric circuit is closed by the movement imparted to the letter regardless of the weight of the letter itself.

Furthermore, I combine with the flap and circuit-closer a latch, by which the parts are held with the circuit closed until liberated by the attendant, and I arrange the circuit-closing device in such a manner that the opening of the door of the letter-box shall cause the breaking of the circuit and the stopping of the alarm.

In the drawings, Figure 1 represents the alarm; Fig. 2, the letter-box by a vertical section at the line *x x* of Fig. 3, which Fig. 3 is a sectional plan below the line *y y;* and Fig. 4 is a vertical section at the line *z z.*

The alarm, Fig. 1, is to be located at the office or room, and the letter-box near the front door or other convenient location for the postman. The wires *a a* extend from the letter-box to the alarm, and in the circuit a suitable battery is to be placed.

The alarm is to be of any desired or proper character. I have represented a bell, *b*, electro-magnet *c*, and a hammer, *d*, operated by the armature of the electro-magnet, so that the alarm will be sounded continuously as long as the circuit is closed.

The letter-box is of any suitable size or shape. I have represented the back *e*, sides *f*, bottom *g*, and top *h* as in one, and *i* is the door to give access to the contents of the box, the same being hinged at *k*, and secured by a suitable lock or fastening.

The slit *l* is represented as in the top of the box, through which a card or letter can be thrust. The flap *m* is of thin light material, extending out from the tubular stock *n*, that turns freely on a stud or gudgeon, *o*. *p* is a balance-weight that is sufficient to keep the flap *m* up to its place near the letter-slit *l* when not otherwise acted on. The stop-block *q* may be used to limit the upward movement.

The circuit-closing arm *r* is upon the stock *n*, so that when the flap *m* is moved by the insertion of a letter the arm *r* will close the electric circuit and operate the distant alarm. A swinging latch, *s*, is provided for catching the end of the circuit-closer when the same has been moved, so that it cannot recede; but the circuit remains closed until the latch *s* is liberated.

The circuit-wires *a a* are shown in the drawings, and their connection to the arm *r* and latch *s* may be of any desired character.

In order to separate the latch *s* from the circuit-closer I employ the lever *t* upon the pivot *u*, that is moved by the spring *v* in one direction to the stop *v'*, and in the other direction by the door as it is closed. When the door *i* is closed the spring *v* is strained, and the end of the lever is moved away from the latch *s;* but when the door is opened for the removal of the contents of the letter-box the spring *v* moves the lever, and that lever acts upon the latch *s* and liberates the circuit-closer and breaks the current.

The dotted lines, Fig. 3, represent the position of the lever and door when open.

I claim as my invention—

1. In combination with the letter-box and an alarm operated by electricity, a circuit-closer and a flap for operating the same, said flap being placed within the box adjacent to the slit through which the letter is thrust, so as to be moved by the pressure upon the letter as it is forced past the flap and falls into the box, substantially as set forth.

2. The combination, with a letter-box and an alarm operated by electricity, of a circuit-closer acted upon by the letter, and a latch to hold the circuit-closer and maintain a closed circuit until the latch is removed, substantially as set forth.

3. In an electric letter-box, the combination, with the circuit-closer, of means for operating the same by the letter to close the circuit, and of mechanism to break the circuit, and the door of the letter-box to operate upon such circuit-breaker, substantially as set forth.

Signed by me this 26th day of June, A. D. 1879.

WILLIAM H. RODGERS.

Witnesses:

GEO. T. PINCKNEY,

WILLIAM G. MOTT.